United States Patent
Freund et al.

(10) Patent No.: US 8,650,879 B2
(45) Date of Patent: Feb. 18, 2014

(54) INTEGRATION OF WASTE HEAT FROM CHARGE AIR COOLING INTO A CASCADED ORGANIC RANKINE CYCLE SYSTEM

(75) Inventors: Sebastian W. Freund, Garching bei Muenchen (DE); Gabor Ast, Jenbach (AT); Pierre Huck, Garching bei Muenchen (DE); Sara Rocci Denis, Garching bei Muenchen (DE); Monika Muchlbauer, Garching bei Muenchen (DE); Albert Scharl, Jenbach (AT); Wolfgang Madl, Jenbach (AT)

(73) Assignee: General Electric Company, Niskayuna, NY (US)

( * ) Notice: Subject to any disclaimer, the term of this patent is extended or adjusted under 35 U.S.C. 154(b) by 229 days.

(21) Appl. No.: 13/090,363

(22) Filed: Apr. 20, 2011

(65) Prior Publication Data

US 2012/0266597 A1    Oct. 25, 2012

(51) Int. Cl.
| | | |
|---|---|---|
| F01K 23/04 | (2006.01) | |
| F01K 13/00 | (2006.01) | |
| F01K 25/00 | (2006.01) | |
| F02B 37/16 | (2006.01) | |
| F01K 23/06 | (2006.01) | |
| F01K 23/14 | (2006.01) | |

(52) U.S. Cl.
USPC .............. 60/655; 60/676; 60/604; 60/670; 60/671

(58) Field of Classification Search
USPC .................................. 60/645–681
See application file for complete search history.

(56) References Cited

U.S. PATENT DOCUMENTS

| 6,497,090 B2* | 12/2002 | Bronicki et al. .............. 60/39.6 |
|---|---|---|
| 7,340,897 B2* | 3/2008 | Zimron et al. ................ 60/641.1 |
| 2009/0211253 A1 | 8/2009 | Radcliff et al. |
| 2010/0089342 A1 | 4/2010 | Wegner et al. |
| 2010/0146968 A1 | 6/2010 | Simpson et al. |
| 2010/0146974 A1 | 6/2010 | Ast et al. |
| 2010/0242476 A1 | 9/2010 | Ast et al. |
| 2010/0242479 A1 | 9/2010 | Ast et al. |
| 2010/0263842 A1 | 10/2010 | Ast et al. |
| 2010/0281865 A1 | 11/2010 | Lehar et al. |
| 2010/0319346 A1 | 12/2010 | Ast et al. |
| 2010/0326076 A1 | 12/2010 | Ast et al. |
| 2011/0016863 A1 | 1/2011 | Ernst |

FOREIGN PATENT DOCUMENTS

WO    WO 2009045196 A1 *  4/2009

OTHER PUBLICATIONS

EP Search Report and Opinion, Applicant—General Electric Company, dated Jul. 24, 2012, pp. 1-6.

* cited by examiner

*Primary Examiner* — Thai Ba Trieu
*Assistant Examiner* — Brian Inacay
(74) *Attorney, Agent, or Firm* — Ann M. Agosti

(57) ABSTRACT

The present application and the resultant patent provide a waste heat recovery system. The waste heat recovery system may include a first organic rankine cycle system, a second organic rankine cycle system, and one or more preheaters. The preheaters may be one or more charge air coolers. The charge air coolers may be in communication with the first organic rankine cycle system, the second organic rankine cycle system, or both the first organic rankine cycle system and the second rankine cycle system.

16 Claims, 3 Drawing Sheets

INTEGRATION OF WASTE HEAT FROM CHARGE AIR COOLING INTO A CASCADED ORGANIC RANKINE CYCLE SYSTEM

TECHNICAL FIELD

The present application and the resultant patent relate generally to power generation systems and more particularly relate to systems and methods for recovering waste heat from charge air cooling of an engine in a cascaded organic rankine cycle system for the generation of electricity.

BACKGROUND OF THE INVENTION

Enormous amounts of waste heat are generated by a wide variety of industrial and commercial processes and operations. Example sources of waste heat include heat from space heating assemblies, steam boilers, engines, and cooling systems. With the use of low grade waste heat, such as waste heat having a temperature of below about 400 degrees Fahrenheit (about 204 degrees Celsius) for example, conventional heat recovery systems generally do not operate with sufficient efficiency to make the recovery of energy cost effective. The net result is that vast quantities of waste heat are simply dumped into the atmosphere, the ground, the water, or other types of surroundings without producing useful work.

In one conventional method to generate electricity from waste heat, a two-cycle system may be used in heat recovery applications with waste heat sources of different temperature levels. In such two-cycle configurations, the hot heat source heats a high boiling point liquid in a top loop and the cold heat source heats a low boiling point liquid in a separate bottom loop. Because these two-cycle systems are complex and require multiple components, however, the overall costs of typical two-cycle systems may be relatively high.

In another conventional system provided to generate electricity from waste heat, a cascaded organic rankine cycle system may be used. The cascaded organic rankine cycle includes a pair of organic rankine cycle systems. The cycles are combined and the respective organic working fluids are chosen such that the organic working fluid of the first organic rankine cycle is condensed at a condensation temperature that is above the boiling point of the organic working fluid of the second organic cycle. A single common heat exchanger may be used as both the condenser of the first organic rankine cycle system and the evaporator of the second organic rankine cycle. A cascaded organic rankine cycle system thus efficiently converts surplus waste heat into electricity within certain temperature ranges.

There is thus a desire therefore for an improved organic rankine cycle system or other type of waste heat system that effectively recovers waste heat over a wide temperature range from multiple low grade heat sources at different operating conditions. For example, the waste heat of one or more charge air coolers may be incorporated into an organic rankine cycle system that otherwise would be dissipated without producing useful work. Such a system would efficiently use the waste heat for increasing net power output.

SUMMARY OF THE INVENTION

The present application and the resultant patent thus provide a waste heat recovery system. The waste heat recovery system may include a first organic rankine cycle system, a second organic rankine cycle system, and one or more preheaters. The preheaters may be one or more charge air coolers. The charge air coolers may be in communication with the first organic rankine cycle system, the second organic rankine cycle system, or both the first organic rankine cycle system and the second rankine cycle system.

The present application and the resultant patent further provide a method of operating a cascaded organic rankine cycle system. The method may include the steps of driving a first organic rankine cycle system with a first heat source, driving a second organic rankine cycle system with a second heat source, and driving the first organic rankine cycle system in part and/or the second organic rankine cycle system in whole or in part with one or more charge air coolers.

The present application and the resultant patent further provide a waste heat recovery system. The waste heat recovery system may include a first organic rankine cycle system, a second organic rankine cycle system, and one or more charge air coolers. The charge air coolers may be in communication with the second organic rankine cycle system.

These and other features and improvements of the present application and the resultant patent will become apparent to one of ordinary skill in the art upon review of the following detailed description when taken in conjunction with the several drawings and the appended claims.

DETAILED DESCRIPTION

As discussed in detail below, the present application and the resultant patent provide a waste heat recovery system having at least two integrated rankine cycle systems coupled to at least two separate heat sources having different temperatures. The first rankine cycle system may be coupled to a first heat source and configured to circulate a first working fluid. The second ranking cycle system may be coupled to at least one second heat source and configured to circulate a second working fluid. The second heat source is at a lower temperature than the first heat source. The waste heat recovery system also includes a cascaded heat exchange unit. The first and second working fluids may be circulated in a heat exchange relationship for condensation of the first working fluid in the first rankine cycle system and evaporation of the second working fluid in the second rankine cycle system.

Two waste heat sources at different temperatures are available in the use of low and high temperature charge air coolers as found in a typical turbo-charged engine. The heat from a low temperature charge air cooler may be integrated in different ways into the low temperature loop of a cascaded organic rankine cycle system for preheating or evaporation. The heat from a high temperature charge air coolers may be integrated in the high temperature loop for preheating the working fluid. Although the waste heat recovery systems using charge air coolers in the examples of FIGS. 1-5 may be described with reference to combustion engines, the systems also may be applicable to other types of heat generation systems such as gas turbines, geothermal, solar, industrial, and residential heat sources, and the like.

Figure 1:
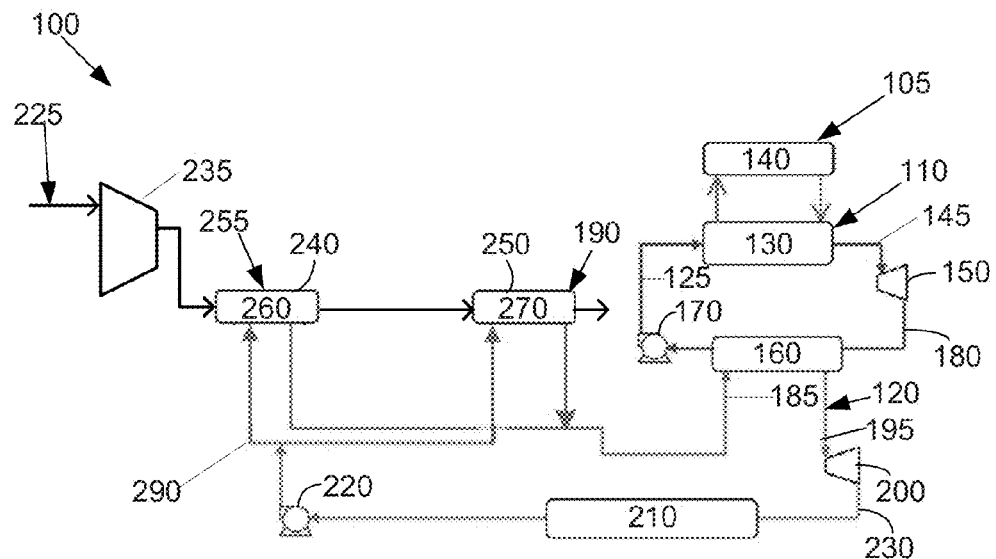
FIG. 1 is a schematic view of a waste heat recovery system having two integrated organic rankine cycle systems using waste heat generated from charge air coolers.

Referring now to the drawings, in which like numerals refer to like elements throughout the several views, FIG. 1 shows a waste heat recovery system 100 as may be described herein. The waste heat recovery system 100 may include a cascaded organic rankine system 105 with a first organic rankine cycle system 110 (a top cycle) and a second organ rankine cycle system 120 (a bottom cycle).

A first organic working fluid 125 may be circulated through the first organic rankine cycle system 110. The first organic working fluid 125 may include cyclohexane, cyclopentane, thiophene, ketones, aromatics, and/or combinations thereof. Other fluids may be used herein. The first organic rankine cycle system 110 may include an exhaust heat exchanger 130. The exhaust heat exchanger 130 may be coupled to a first heat source 140. The first heat source 140 may be an exhaust unit of a combustion engine. Other types of heat sources may be used herein. The temperature of the first heat source 140 in the case of the engine may be in the temperature range of about 400 to about 500 degrees Celsius. Other temperature may be used herein.

The exhaust heat exchanger 130 receives heat from the exhaust gas generated by the first heat source 140 and generates a first organic working fluid vapor 145. The first organic working fluid vapor 145 may be passed through a high temperature expander 150. The first organic working fluid vapor 145 drives the high temperature expander 150 to produce useful work. The first organic working fluid vapor 145 at a relatively lower pressure and lower temperature then passes through a cascaded heat exchanger 160. The first organic working fluid vapor 145 may be condensed back into liquid form which then may be pumped via a pump 170 or other device back to the exhaust heat exchanger 130. The cycle may then be repeated. The exhaust heat exchanger 130, the high temperature expander 150, the cascaded heat exchanger 160, and the pump 170 thus may be arranged in a high temperature loop 180. Other components and other configurations may be used herein.

A second organic working fluid 185 may include propane, butane, pentafluoro-propane, pentafluoro-butane, pentafluoro-polyether, oil, and/or combinations thereof. Other fluids may be used herein. In other examples, the first or the second organic working fluid may include a binary fluid. The binary fluids may include cyclohexane-propane, cyclohexane-butane, cyclopentane-butane, or cyclopentane-pentafluoropropane, and the like. Neither the first nor the second organic working fluids may be expanded below atmospheric pressure. The boiling point temperature of the first organic working fluid 125 may be below the average temperature of the second working fluid 185.

The cascaded heat exchanger 160 may be used a both a condenser for the first organic rankine cycle system 110 and as an evaporator for the second organic rankine cycle system 120. The second organic rankine cycle system 120 may include one or more second heat sources 190 in communication with the cascade heat exchanger 160. The second heat source 190 has a lower temperature than that of the first heat source 140. The first and second heat sources 140, 190 may include other types of low grade heat sources. The cascaded heat exchanger 160 receives heat from the first organic working fluid 125 and generates a second organic working fluid vapor 195. The second organic working fluid vapor 195 may be passed through a low temperature expander 200. The second organic working fluid vapor 195 drives the low temperature expander 200 to produce useful work. After passing through the low temperature expander 200, the second organic working fluid vapor 195 at lower pressure and lower temperature may be passed through a low temperature condenser 210. The second organic working fluid vapor 195 may be condensed back into the liquid form. The liquid then may be pumped via a low temperature pump 220 to the second heat sources 190. The cycle then may be repeated. The cascaded heat exchanger 160, the low temperature expander 200, the low temperature condenser 210, the low temperature pump 220, and the second heat sources 190 thus are included in a low temperature loop 230. Other components and other configurations may be used herein.

As described above, the first heat source 140 may be the exhaust gases of an engine 225 such as an internal combustion engine. The ambient air intake of such an internal combustion engine 225 may be compressed in a turbo-charger 235 of one or more stages. The intake air thus increases in temperature during the compression stages. As a result, charge air coolers 255 thus may be used downstream of the turbo-chargers to cool the incoming flow of air. Multiple charge air coolers 255 at multiple temperatures may be used herein.

FIG. 1 thus shows the low temperature loop 230 including a number ber of preheaters: a first preheater 240 and a second preheater 250. Any number of preheaters may be used herein. The first preheater 240 may be a first stage charge air cooler 260 and the second preheater 250 may be a second stage charge air cooler 270. The charge air coolers 260, 270 thus act as the secondary heat sources 190 for the low temperature loop 230. Specifically, the charge air coolers 260, 270 cool the incoming charge air flow while heating the second organic working fluid 185. Other types of secondary heat sources 190 may be integrated herein. Other components and other configurations may be used herein.

The waste heat recovery system 100 thus uses the waste heat from charge air cooling for preheating the working fluid (the second organic working fluid 185) in the low temperature loop 230. Preheating the working fluid thus may increase the efficiency and power output of the low temperature loop 230 by adding more secondary heat sources 190 while decreasing the temperature differences between source and working fluids. In this example, the flow of the second organic working fluid 185 may be a branched flow 290 between the preheaters 240, 250.

Figure 2:
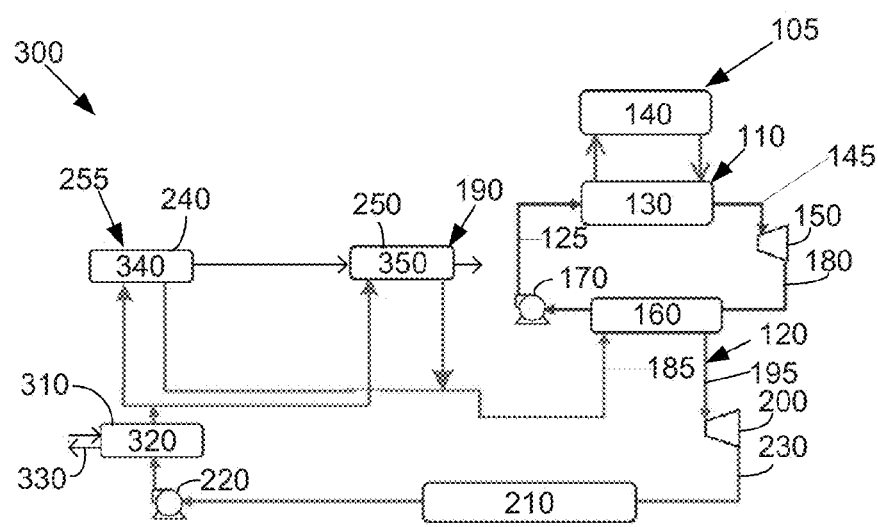
FIG. 2 is a schematic view of an alternative embodiment of a waste heat recovery system having two integrated organic rankine cycle systems using waste heat from charge air coolers.

FIG. 2 shows a further example of a waste heat recovery system 300. The waste heat recovery system 300 may use a similar high temperature loop 180 as described above. Likewise, the low temperature loop 230 may be similar but with the addition of a third preheater 310. The third preheater 310 may be a cooling water jacket heat exchanger 320 in communication with a cooling water jacket flow 330. The cooling water jacket heat exchanger 320 thus heats the second organic working fluid 185 before entering into the first and second preheaters 240, 250 acting as the charge air coolers. In this example, the first and second preheaters 240, 250 may be a stage one high temperature charge air cooler 340 and a stage two high temperature charge air cooler 350. The low temperature sections of these charge air coolers may need additional cooling in this configuration. Other components and other configurations also may be used herein.

Figure 3:
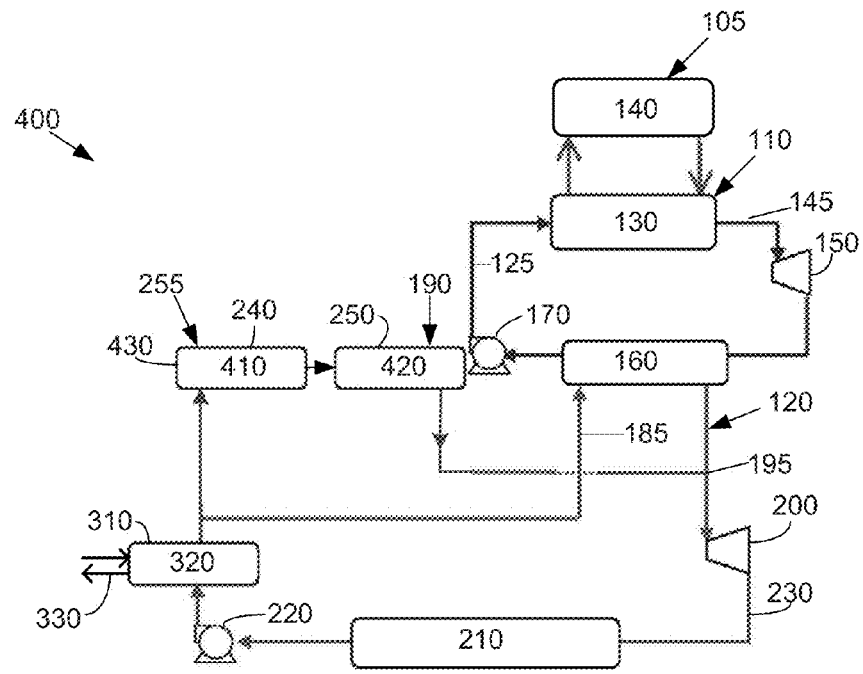
FIG. 3 is a schematic view of an alternative embodiment of a waste heat recovery system having two integrated organic rankine cycle systems using waste heat from charge air coolers.

FIG. 3 shows a further example of a waste heat recovery system 400 as may be described herein. The waste heat recovery system 400 may use the high temperature loop 180 similar to that described above. Likewise, the lower temperature loop 230 may use the first preheater 240 as a low temperature charge air cooler 410, the second preheater 250 as a high temperature charge air cooler 420, and the third preheater 310 as the cooling water jacket heat exchanger 320. In this example, the preheaters 240, 250 may have an in series position 430 with a branched flow to the cascaded heat exchanger 160. The cooling water jacket heat exchanger 320 may be integrated at a higher mass rate with a lower temperature herein. Other components and other configurations may be used herein.

Figure 4:
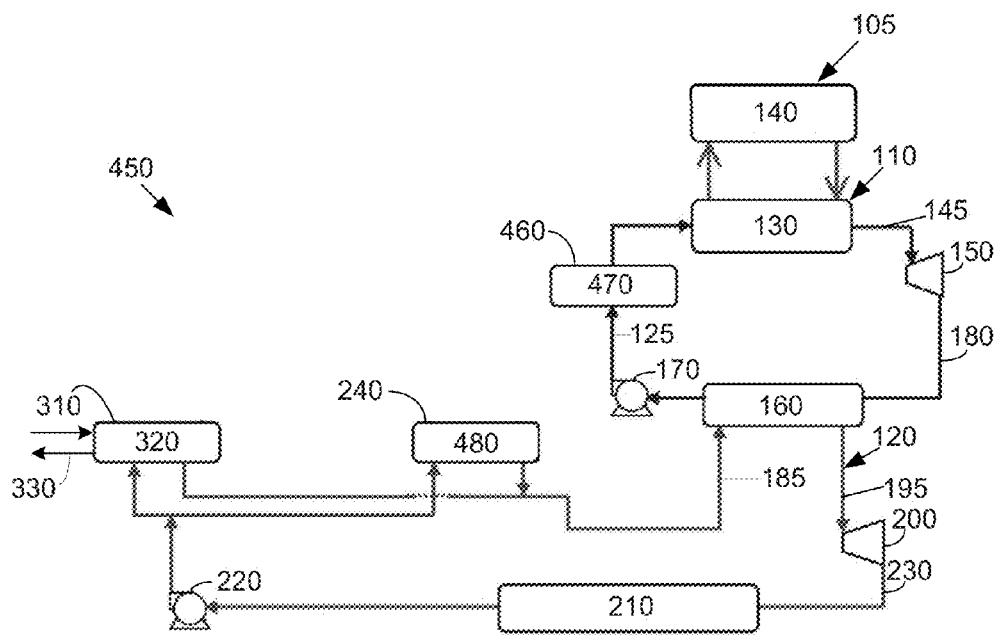
FIG. 4 is a schematic view of an alternative embodiment of a waste heat recovery system having two integrated organic rankine cycle systems using waste heat from charge air coolers.

FIG. 4 shows a further embodiment of a waste heat recovery system 450 as may be described herein. In this example, the high temperature loop 180 includes a high temperature preheater 460 therein. The high temperature preheater 460 may be a high temperature charge air cooler 470. Likewise, the low temperature loop 230 may include the first preheater 240 as a low temperature charge air cooler 480. The third preheater 310 also may be the cooling water jacket heat exchanger 320. In this example, the flow of the second organic working fluid 185 may be split between the preheaters 240, 310. As such, the high temperature sections of the charge air coolers are integrated into the high temperature loop 180 with the use of water jacket cooling in the low temperature loop 230. Other components and other configurations may be used herein.

Figure 5:
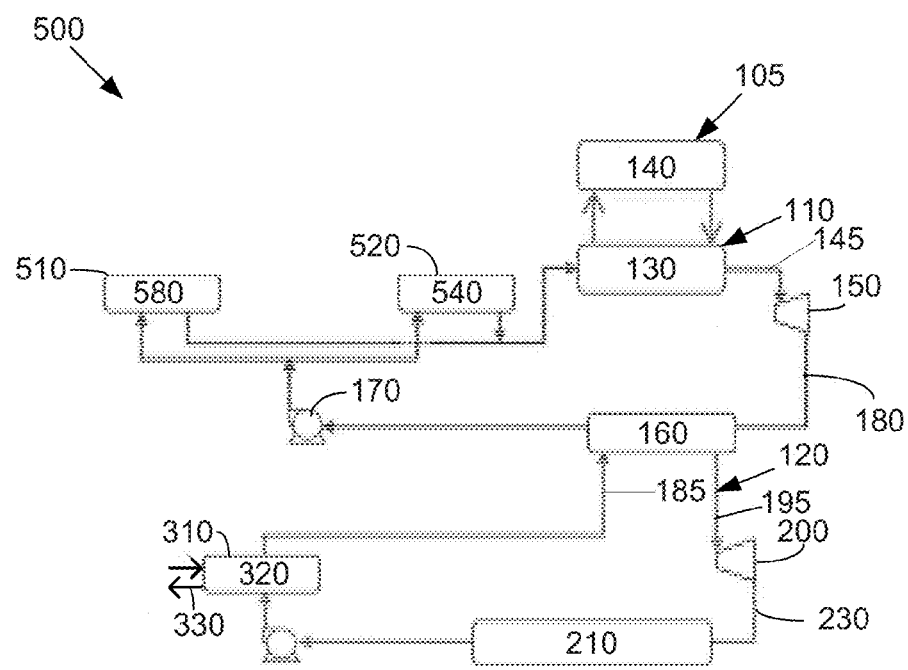
FIG. 5 is a schematic view of an alternative embodiment of a waste heat recovery system having two integrated organic rankine cycle systems using waste heat from charge air coolers.

FIG. 5 shows a further example of a waste heat recovery system 500 as may be described herein. In this example, a first high temperature preheater 510 and a second high temperature preheater 520 may be positioned within the high temperature loop 180. The first high temperature preheater 510 may be a stage one high temperature charge air cooler 530 while the second high temperature preheater 520 may be a stage two high temperature charge air cooler 540. The low temperature loop 230 includes the third preheater 310 as the cooling water jacket heat exchanger 320. In this example, no low temperature charge air cooling heat is used herein. Other components and other configurations may be used herein.

The waste heat recovery systems described herein thus use the waste heat from charge air cooling for preheating the working fluids herein so as to raise the flow rate and the net power output. The addition of more heat sources while decreasing the temperature differences between the source and working fluids thus serve to increase the overall efficiency and power output. The heat of low and high temperature coolers thus may be integrated in different ways into the low temperature loop 230 described herein for preheating and evaporation while the heat of the high temperature charge air coolers also may be recovered in the high temperature loop 180 for preheating the working fluid. Heat source of higher temperatures may be integrated into the high temperature loop 180 with a recuperater, an exhaust gas recovery cooler, and the like. For the low temperature loop 230, the heat may be integrated herein instead of jacket water cooling, oil cooling and the like. Various before and after positions may be used herein as well as series, parallel, or branched flows. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A waste heat recovery system, comprising:
a first organic rankine cycle system for circulating a first organic working fluid, the first organic rankine cycle system configured in a high temperature loop including an exhaust heat exchanger, a high temperature expander, a cascade heat exchanger and a pump,
wherein the first exhaust heat exchanger receives heat generated by to a first heat source and generates a first organic working fluid vapor for driving the high temperature expander to produce useful work, and
wherein the cascade heat exchanger condenses the first organic working fluid vapor into liquid that is pumped back to the exhaust heat exchanger; and
a second organic rankine cycle system for circulating a second organic working fluid, the second organic rankine cycle system configured in a low temperature loop including the cascade heat exchanger of the first organic rankine cycle system, a low temperature expander, a low temperature condenser, a low temperature pump and one or more preheaters,
wherein the cascade heat exchanger of the first organic rankine cycle system receives heat from the second heat source and the first organic working fluid and generates a second organic working fluid vapor for driving the low temperature expander to produce useful work, and
wherein the low temperature condenser condenses the second organic working fluid vapor into liquid that is pumped back to the second heat source, and
wherein the one or more preheaters comprise one or more charge air coolers for heating the second organic working fluid while cooling incoming charge air flow from a turbo-charger positioned upstream of the one or more preheaters.

2. The waste heat recovery system of claim 1, wherein the one or more preheaters comprise a first preheater and a second preheater.

3. The waste heat recovery system of claim 2, wherein the first preheater and the second preheater comprise a branched position.

4. The waste heat recovery system of claim 2, wherein the first preheater and the second preheater comprise an in series position.

5. The waste heat recovery system of claim 2, wherein the one or more charge air coolers comprise a low temperature charge air cooler and a high temperature charge air cooler.

6. The waste heat recovery system of claim 1, wherein the one or more charge air coolers comprise a stage one charge air cooler and a stage two charge air cooler.

7. The waste heat recovery system of claim 1, wherein the one or more charge air coolers comprise a stage one high temperature charge air cooler and a stage two high temperature charge air cooler.

8. The waste heat recovery system of claim 1, wherein the one or more preheaters comprise a third preheater and wherein the third preheater comprises a cooling water jacket heat exchanger.

9. The waste heat recovery system of claim 1, wherein the one or more preheaters comprise a high temperature preheater in communication with the first organic rankine cycle system.

10. The waste heat recovery system of claim 9, wherein the one or more preheaters comprises a low temperature preheater in communication with the second organic rankine cycle system.

11. The waste heat recovery system of claim 1, wherein the one or more charge air coolers comprise a stage one high temperature charge air cooler and a stage two high temperature charge air cooler in communication the first organic rankine cycle system.

12. A waste heat recovery system, comprising:
- a first organic rankine cycle system for circulating a first organic working fluid, the first organic rankine cycle system configured in a high temperature loop including an exhaust heat exchanger, a high temperature expander, a cascade heat exchanger and a pump,
- wherein the first exhaust heat exchanger receives heat generated by to a first heat source and generates a first organic working fluid vapor for driving the high temperature expander to produce useful work, and
- wherein the cascade heat exchanger condenses the first organic working fluid vapor into liquid that is pumped back to the exhaust heat exchanger;
- a second organic rankine cycle system for circulating a second organic working fluid, the second organic ranking cycle system configured in a low temperature loop including the cascade heat exchanger of the first organic rankine cycle system, a low temperature expander, a low temperature condenser, a low temperature pump and one or more charge air coolers,
- wherein the cascade heat exchanger of the first organic rankine cycle system receives heat from the second heat source and the first organic working fluid and generates a second organic working fluid vapor for driving the low temperature expander to produce useful work, and
- wherein the low temperature condenser condenses the second organic working fluid vapor into liquid that is pumped back to the second heat source, and
- wherein the one or more charge air coolers heat the second organic working fluid while cooling incoming charge air flow from a turbo-charger positioned upstream of the one or more preheaters.

13. The waste heat recovery system of claim 12, wherein the one or more charge air coolers comprise a stage one charge air cooler and a stage two charge air cooler.

14. The waste heat recovery system of claim 12, wherein the one or more charge air coolers comprise a stage one high temperature charge air cooler and a stage two high temperature charge air cooler.

15. The waste heat recovery system of claim 12, wherein the one or more charge air coolers comprise a low temperature charge air cooler and a high temperature charge air cooler.

16. The waste heat recovery system of claim 15, wherein the second organic rankine cycle system comprises a cooling water jacket heat exchanger in communication therewith.

* * * * *

UNITED STATES PATENT AND TRADEMARK OFFICE
CERTIFICATE OF CORRECTION

| | | |
|---|---|---|
| PATENT NO. | : 8,650,879 B2 | Page 1 of 1 |
| APPLICATION NO. | : 13/090363 | |
| DATED | : February 18, 2014 | |
| INVENTOR(S) | : Freund et al. | |

It is certified that error appears in the above-identified patent and that said Letters Patent is hereby corrected as shown below:

On the Title Page, in Item (75), under "Inventors", in Column 1, Line 6, delete "Muchlbauer," and insert -- Muehlbauer, --, therefor.

In the Specification:

In Column 2, Line 54, delete "ranking cycle system" and insert -- rankine cycle system --, therefor.

In Column 4, Line 30, delete "a number ber of" and insert -- a number of --, therefor.

In the Claims:

In Column 6, Lines 16-17, in Claim 1, delete "ranking cycle system" and insert -- rankine cycle system --, therefor.

In Column 7, Lines 18-19, in Claim 1, delete "ranking cycle system" and insert -- rankine cycle system --, therefor.

Signed and Sealed this
Twenty-seventh Day of May, 2014

Michelle K. Lee
*Deputy Director of the United States Patent and Trademark Office*